United States Patent
Ono et al.

(10) Patent No.: US 9,620,793 B2
(45) Date of Patent: Apr. 11, 2017

(54) HYBRID SYSTEM

(71) Applicant: KYOCERA Corporation, Kyoto-shi, Kyoto (JP)

(72) Inventors: Takashi Ono, Kirishima (JP); Eizou Matsui, Kizugawa (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 103 days.

(21) Appl. No.: 14/419,657

(22) PCT Filed: Aug. 7, 2013

(86) PCT No.: PCT/JP2013/071438
§ 371 (c)(1),
(2) Date: Feb. 5, 2015

(87) PCT Pub. No.: WO2014/024946
PCT Pub. Date: Feb. 13, 2014

(65) Prior Publication Data
US 2015/0207157 A1    Jul. 23, 2015

(30) Foreign Application Priority Data

Aug. 7, 2012 (JP) .................................. 2012-175055
Sep. 21, 2012 (JP) .................................. 2012-208370
(Continued)

(51) Int. Cl.
H01M 8/06 (2016.01)
H01M 8/04007 (2016.01)
(Continued)

(52) U.S. Cl.
CPC ..... H01M 8/04007 (2013.01); H01M 8/0662 (2013.01); F25B 9/14 (2013.01);
(Continued)

(58) Field of Classification Search
None
See application file for complete search history.

(56) References Cited

U.S. PATENT DOCUMENTS 5,345,786 A    9/1994  Yoda et al.
6,604,364 B1 *  8/2003  Arman ............................ 60/520
(Continued)

FOREIGN PATENT DOCUMENTS

JP    2005188846 A    7/2005
JP    2006009579 A    1/2006
(Continued)

OTHER PUBLICATIONS

Lee, "Cooking with sound: new stone/generator/refrigerator combo aimed at developing nations," Arstechnica, published May 28, 2007 and accessed Jul. 27, 2016.*

(Continued)

*Primary Examiner* — Eli Mekhlin

(57) ABSTRACT

[Object] To provide a hybrid system of which overall efficiency is improved.
[Solution] A hybrid system of the invention includes: a fuel cell device; and a thermoacoustic cooler. The thermoacoustic cooler 14 includes: a thermoacoustic energy generating section 20 in which thermoacoustic energy is generated by a temperature gradient between a high-temperature side and a low-temperature side; and a cooling section 21 in which a function of cooling is performed in the low-temperature side using the temperature gradient between the high-temperature side and the low-temperature side which is produced when the thermoacoustic energy transmitted from the thermoacoustic energy generating section 20 is converted into energy. The system is configured to cause exhaust gas emitted from the fuel cell device to flow through the high-temperature side of the thermoacoustic energy gener- (Continued)

ating section 20. Therefore, it is possible to achieve the hybrid system of which overall efficiency is improved.

10 Claims, 12 Drawing Sheets

(30) Foreign Application Priority Data

Sep. 24, 2012 (JP) ................................. 2012-209778
Nov. 15, 2012 (JP) ................................. 2012-251325

(51) Int. Cl.
*H01M 8/0662* (2016.01)
*F25B 9/14* (2006.01)
*F25B 27/02* (2006.01)
*H01M 8/04014* (2016.01)
*H01M 8/124* (2016.01)

(52) U.S. Cl.
CPC ......... *F25B 27/02* (2013.01); *H01M 8/04022* (2013.01); *H01M 8/04074* (2013.01); *H01M 2008/1293* (2013.01); *H01M 2250/10* (2013.01); *H01M 2250/40* (2013.01); *H01M 2250/405* (2013.01); *Y02B 90/14* (2013.01); *Y02B 90/16* (2013.01); *Y02E 60/525* (2013.01); *Y02E 60/56* (2013.01)

(56) References Cited

U.S. PATENT DOCUMENTS

| | | | |
|---|---|---|---|
| 6,615,601 B1* | 9/2003 | Wiggs | 165/45 |
| 7,772,746 B2 | 8/2010 | Keolian et al. | |
| 8,187,559 B2 | 5/2012 | Gruss et al. | |
| 8,535,844 B2 | 9/2013 | Ono | |
| 2002/0076592 A1* | 6/2002 | Sato | 429/442 |
| 2005/0115150 A1* | 6/2005 | Ukai | 48/89 |
| 2007/0026274 A1* | 2/2007 | Akita | 429/429 |
| 2011/0045363 A1 | 2/2011 | Polack | |
| 2011/0269037 A1* | 11/2011 | Burmeister | 429/415 |

FOREIGN PATENT DOCUMENTS

| | | |
|---|---|---|
| JP | 2006105009 A | 4/2006 |
| JP | 2007059377 A | 3/2007 |
| JP | 2007263541 A | 10/2007 |
| JP | 2010073982 A | 4/2010 |
| JP | 2010174686 A | 8/2010 |

OTHER PUBLICATIONS

International Search Report issued in the corresponding PCT International Application No. PCT/JP2013/071438 dated Oct. 29, 2013, 2 pages.

European Search Report issued in the corresponding European patent application No. 13827671.2, dated Feb. 17, 2016.

* cited by examiner

HYBRID SYSTEM

RELATED APPLICATIONS

The present application is a national stage entry according to 35 U.S.C. §371 of PCT application No.: PCT/JP2013/071438 filed on Aug. 7, 2013, which claims priorities from Japanese application Nos.: 2012-175055 filed on Aug. 7, 2012, 2012-208370 filed on Sep. 21, 2012, 2012-209778 filed on Sep. 24, 2012 and 2012-251325 filed on Nov. 15, 2012, and are incorporated herein by reference in its entirety.

TECHNICAL FIELD

The present invention relates to a hybrid system into which a thermoacoustic cooling machine and a fuel cell device are incorporated.

BACKGROUND ART

In recent years, there have been proposals for various types of fuel cell modules in which a fuel cell that can obtain power using fuel gas (hydrogen-containing gas) and oxygen-containing gas (air), as a next-generation energy source, is accommodated in a container, and various types of fuel cell devices in which the fuel cell module is accommodated in an outer case (for example, see PTL 1).

Currently, regarding a hybrid system which includes such a fuel cell device, there have been proposals for a hybrid system in which water is heated using heat produced through power generation of the fuel cell device, or into which other power generation devices such as a Stirling engine are incorporated, such that overall efficiency is improved (for example, see PTL 2).

Further, in recent years, there have been proposals for a high-temperature producing instrument that focuses on thermoacoustic energy (for example, see PTL 3).

CITATION LIST

Patent Literature

PTL 1: Japanese Unexamined Patent Application Publication No. 2007-59377
PTL 2: Japanese Unexamined Patent Application Publication No. 2010-174686
PTL 3: Japanese Unexamined Patent Application Publication No. 2007-263541

SUMMARY OF INVENTION

Technical Problem

As described above, currently, hybrid systems have been proposed, into which a fuel cell device and other systems are incorporated. Although these hybrid systems are assumed to be used appropriately in accordance with an application environment, there is still room for improvement in terms of the overall efficiency.

The present invention aims to provide a hybrid system that is useful particularly for a commercial facility such as a convenience store or a supermarket as the application environment.

Solution to Problem

The present invention provides a hybrid system including: a fuel cell device; and a thermoacoustic cooler. The thermoacoustic cooler includes a thermoacoustic energy generating section in which thermoacoustic energy is generated by a temperature gradient between a high-temperature side and a low-temperature side and a cooling section in which a function of cooling is performed in the low-temperature side using the temperature gradient between the high-temperature side and the low-temperature side which is produced when the thermoacoustic energy transmitted from the thermoacoustic energy generating section is converted into energy. Exhaust gas emitted from the fuel cell device flows through the high-temperature side of the thermoacoustic energy generating section.

Advantageous Effects of Invention

According to the present invention, since the hybrid system has a configuration in which the exhaust gas emitted from the fuel cell device flows through the high-temperature side of the thermoacoustic energy generating section, a sound wave can be generated efficiently in the thermoacoustic energy generating section. Accordingly, the thermoacoustic cooler, in which the function of cooling can be reinforced in the cooling section, and the fuel cell device are incorporated into the hybrid system such that the hybrid system is useful particularly for a commercial facility such as a convenience store or a supermarket which requires power supply, cold storage, and freezing.

DESCRIPTION OF EMBODIMENTS

Figure 1:
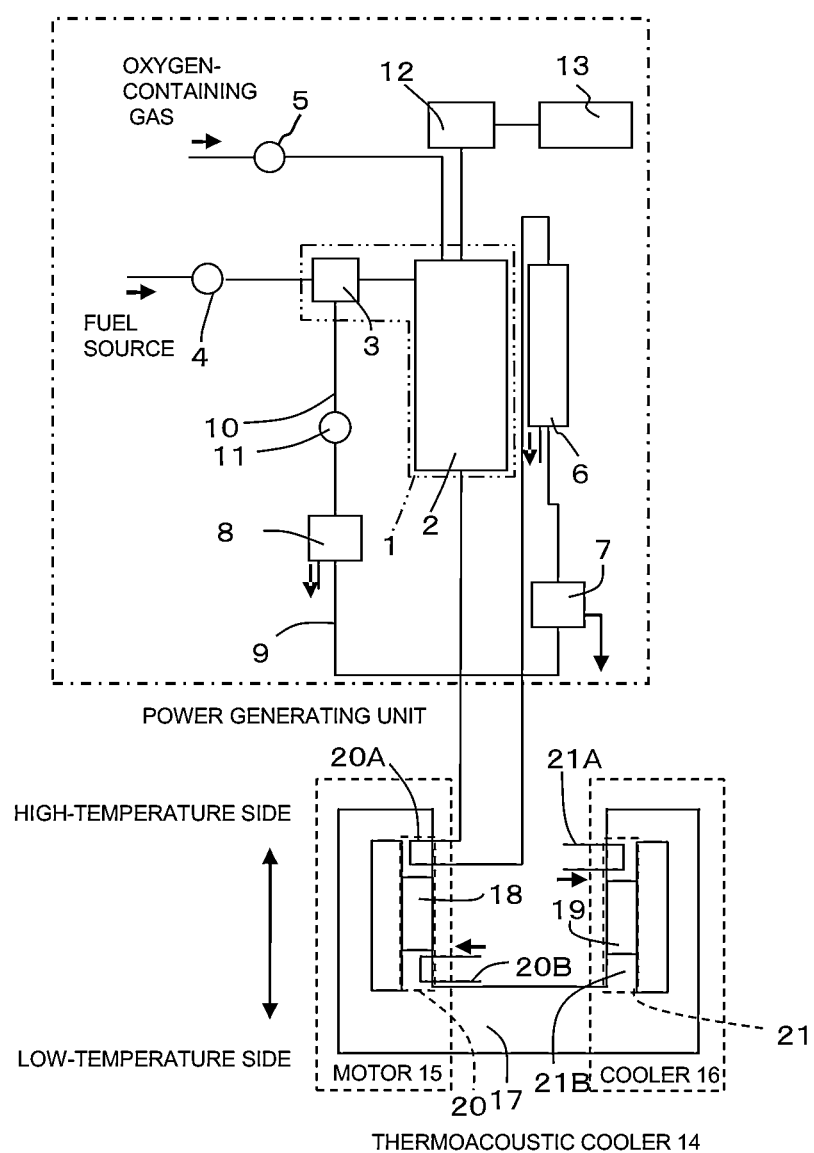
FIG. 1 is a diagram illustrating an example of a configuration of a hybrid system according to the present embodiment.

FIG. 1 is a diagram illustrating an example of a configuration of a hybrid system according to the present embodiment.

The hybrid system illustrated in FIG. 1 includes a power generating unit which corresponds to an example of a fuel cell device, and a thermoacoustic cooler that generates thermoacoustic energy using exhaust gas emitted from the power generating unit and performs cooling (freezing) using the generated thermoacoustic energy. The same reference numbers are attached to the same members in the following drawings.

The power generating unit illustrated in FIG. 1 includes a cell stack 2 that has a plurality of fuel cells, fuel source feeding means 4 that feeds a fuel source such as town gas, oxygen-containing gas feeding means 5 for feeding an oxygen-containing gas to the fuel cells that configure the cell stack 2, and a reformer 3 that performs steam reforming of the fuel source using the fuel source and water vapor. Although described later, a fuel cell module 1 (hereinafter, abbreviated to module 1 in some cases) is configured to accommodate the cell stack 2 and the reformer 3 in a container and is illustrated by being surrounded by a two-dot chain line in FIG. 1. Although not illustrated in FIG. 1, an ignition device for burning a fuel gas that is not used in power generation is provided in the module 1.

In addition, the power generating unit illustrated in FIG. 1 includes a heat exchanger 6 that performs heat exchange for exhaust gas (exhaust heat) produced through power generation from the fuel cells that configure the cell stack 2 and thus lowers the temperature of the exhaust gas. The heat exchanger 6 includes a condensed water processing device 7 for processing condensed water obtained by condensing moisture contained in the exhaust gas into pure water and a water tank 8 for storing the processed water (pure water) in the condensed water processing device 7. The water tank 8 and the heat exchanger 6 are connected by a condensed water feeding pipe 9. According to water quality of the condensed water produced through heat exchange by the heat exchanger 6, it is possible to employ a configuration in which the condensed water processing device 7 is not provided. Further, in a case where the condensed water processing device 7 has a function of storing water, it is possible to employ a configuration in which the water tank 8 is not provided.

Water stored in the water tank 8 is fed to the reformer 3 by a water pump 11 provided on a water feeding pipe 10 to which the water tank 8 and the reformer 3 are connected.

Further, the power generating unit illustrated in FIG. 1 includes a power supply adjusting unit (power conditioner) 12 that converts DC power generated in the module 1 into AC power and adjusts a supply rate of the converted electricity to an external load and a controller 13 that controls operations of various elements. The elements that configure the power generating unit are accommodated in an outer case and thereby it is possible to achieve the fuel cell device of which installation, transporting, or the like is easily performed.

Subsequently, a thermoacoustic cooler 14 is described. The thermoacoustic cooler 14 is configured to have a motor 15, a cooler 16, and a connection pipe 17 that connects the motor 15 and the cooler 16. The motor 15, the cooler 16, and the connection pipe 17 are filled with a gas such as helium gas. In addition, heat accumulators 18 and 19 are disposed in the motor 15 and the cooler 16, respectively. One side of the heat accumulator 18 of the motor 15 is high in temperature (upper side in FIG. 1) and the other side thereof is low in temperature (lower side in FIG. 1), which results in a temperature gradient that causes thermoacoustic energy (sound waves) to be generated. Accordingly, there are provided a high-temperature side flow path 20A through which a high-temperature fluid for heating one side of the heat accumulator 18 flows and a low-temperature side flow path 20B through which a low-temperature fluid for cooling the other side thereof flows. The thermoacoustic energy generating section 20 is configured to include the heat accumulator 18, the high-temperature side flow path, and the low-temperature side flow path. In addition, in FIG. 1, the high-temperature side flow path 20A, the low-temperature side flow path 20B, and the heat accumulator 18 as the thermoacoustic energy generating section 20 are collectively surrounded by a dotted line.

The thermoacoustic energy generated in the thermoacoustic energy generating section 20 resonates when flowing through the motor 15 and the connection pipe 17 and the thermoacoustic energy is transmitted to the cooler 16. The energy of the thermoacoustic energy is converted into heat energy in the cooler 16. A flow path 21A through which the fluid flows is provided on the high-temperature side (upper side in FIG. 1) which corresponds to one side of the heat accumulator 19. Thus, on the other side (lower side in FIG. 1) of the heat accumulator 19 an endothermic reaction occurs and causes the temperature to be lowered and, thereby, a cooling function is performed. That is, a cooling section 21 is configured to include the heat accumulator 19, the flow path 21A which corresponds to the high-temperature side, and a portion 21B which corresponds to the low-temperature side. In the cooling section 21, the flow path 21A means a flow path through which a high-temperature fluid flows when compared to the low-temperature side on the other side, but it is not necessary for the high-temperature fluid to flow. Particularly, the temperature of the fluid flowing through the flow path 21A in the cooling section 21 is lowered, thereby, the temperature of the portion 21B which corresponds to the low-temperature side is further lowered and, thus a freezing function is performed. In other words, the cooling section 21 has a function as a freezing unit. Accordingly, tap water at room temperature or the like flows through, for example, the flow path 21A and, thereby it is possible to lower the temperature of the portion 21B which corresponds to the low-temperature side to, for example, about −70° C. In FIG. 1, the flow path 21A, the portion 21B which corresponds to the low-temperature side, and the heat accumulator 19 as the cooling section 21 are collectively surrounded by a dotted line.

Here, a method of operating the hybrid system illustrated in FIG. 1 is described. At the time of starting up the fuel cell device, the controller 13 causes the fuel source feeding means 4, the oxygen-containing gas feeding means 5, the water pump 11, and the ignition device to be operated. At this time, since the temperature of the module 1 is low, the power generation by the fuel cell or a reforming reaction by the reformer 3 is not performed. Nearly an entire quantity of a fuel gas supplied by the fuel source feeding means 4 is combusted as fuel gas not used for power generation, which produces combustion heat that causes the temperature of the module 1 or the reformer 3 to rise. When the temperature of the reformer 3 becomes a temperature at which steam reforming can be performed, the reformer 3 performs the steam reforming and generates the fuel gas which corresponds to hydrogen-containing gas needed for power generation of the fuel cell. After the reformer 3 gains the temperature at which the steam reforming can be performed, the controller 13 may control the water pump 11 such that the pump operates. When the fuel cell is at the temperature at which the power generation can be started up, the fuel cell starts the power generation with the exhaust gas produced in the reformer 3 and the oxygen-containing gas supplied by the oxygen-containing gas feeding means 5. Electricity generated by the cell stack 2 is converted into AC power in a power supply adjusting unit 12 and, then is supplied to an external load.

After power generation is started in the fuel cell, the controller 13, for efficient operation of the fuel cell device, controls operations of the fuel source feeding means 4, the oxygen-containing gas feeding means 5, the water pump 11, and the like on the basis of preset fuel utilization (Uf), air utilization (Ua), and a value of S/C which represents a molar ratio between carbon in the fuel and water in the steam reforming by the reformer 3. The fuel utilization is a value obtained by dividing an amount of the fuel gas used for power generation by an amount of the fuel gas (fuel source) supplied by the fuel source feeding means 4, and the air utilization is a value obtained by dividing an amount of air used for power generation by an amount of air supplied by the oxygen-containing gas feeding means 5.

The exhaust gas produced through the operation of the cell stack 2 flows through the high-temperature side flow path 20A that configures the thermoacoustic energy generating section 20 in the motor 15 of the thermoacoustic cooler 14. Specifically, piping (flow path) through which the exhaust gas emitted from the fuel cell device flows is provided to surround one side (high-temperature side) of the piping in which a heat accumulator 18 is disposed. Such a configuration enables the exhaust gas to flow through the high-temperature side flow path 20A of the thermoacoustic energy generating section 20. In the following description as well, each unit of piping is disposed to surround the piping of the thermoacoustic cooler 14 and is configured to cause each fluid to flow through each portion of the thermoacoustic cooler 14.

Thus, a temperature gradient is produced between one side and the other side of the heat accumulator 18 and it is possible to generate thermoacoustic energy. The greater a difference between the temperatures of the low-temperature side and the high-temperature side of the heat accumulator 18 which correspond to the thermoacoustic energy generating section 20, the more efficiently the thermoacoustic energy can be generated. Therefore, for example, tap water at room temperature or the like may be fed to the low-temperature side flow path 20B.

In addition, in the hybrid system illustrated in FIG. 1, a solid oxide fuel cell (cell stack 2) is used as the fuel cell, thereby, heat of the exhaust gas emitted from the module 1 becomes extremely high in temperature and, thus, a temperature gradient is more likely to be produced. In this way, it is possible to efficiently generate thermoacoustic energy and it is possible to achieve the thermoacoustic cooler 14 which has a good cooling function by using the generated thermoacoustic energy.

One end of the high-temperature side flow path 20A is connected to the heat exchanger 6. That is, a configuration is employed, in which the exhaust gas emitted from the fuel cell device flows through the high-temperature side flow path 20A which corresponds to the high-temperature side of the thermoacoustic energy generating section and, then, flows to the heat exchanger 6. It is preferable that, in the heat exchanger 6, the temperature of the exhaust gas fed to the heat exchanger 6 be lowered substantially to room temperature, and the exhaust gas emitted from the fuel cell device be subjected to heat exchange with, for example, water, fuel gas or oxygen-containing gas which is fed to the fuel cell device, or the like.

In addition, water contained in the exhaust gas emitted from the cell stack 2 through heat exchange in the heat exchanger 6 is condensed and the condensed water is fed to the condensed water processing device 7 through the condensed water feeding pipe 9. The condensed water is processed to become pure water in the condensed water processing device 7 and the processed pure water is fed to the water tank 8. Water stored in the water tank 8 is fed to the reformer 3 through a water feeding pipe 10 by the water pump 11. In this way, condensed water is effectively utilized and, thus it is possible to perform operation using water self-sustainingly.

As described above, since the hybrid system according to the present embodiment has a function as the cooler 16 in the thermoacoustic cooler 14, as well as a function of power generation by the fuel cell device, it is possible to achieve the hybrid system which is useful particularly for a commercial facility such as a convenience store or a supermarket and of which overall efficiency is improved.

Subsequently, the fuel cell device according to the present embodiment will be described.

Figure 2:
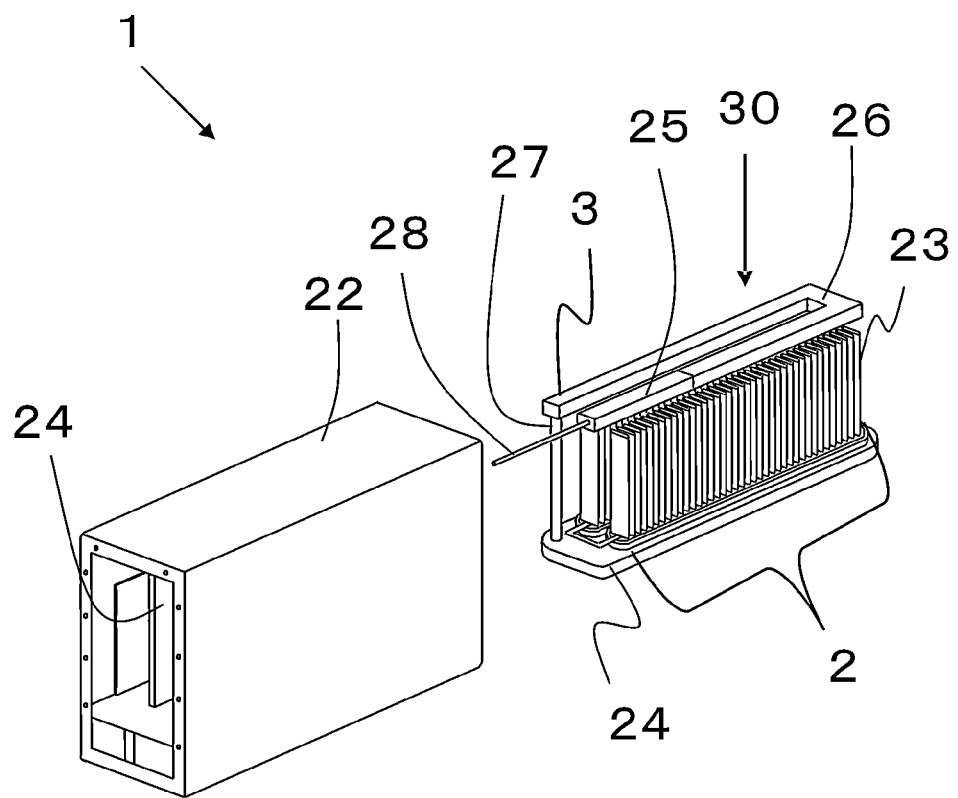
FIG. 2 is an external perspective view illustrating an example of a fuel cell module that configures a fuel cell device according to the present embodiment.
Figure 3:
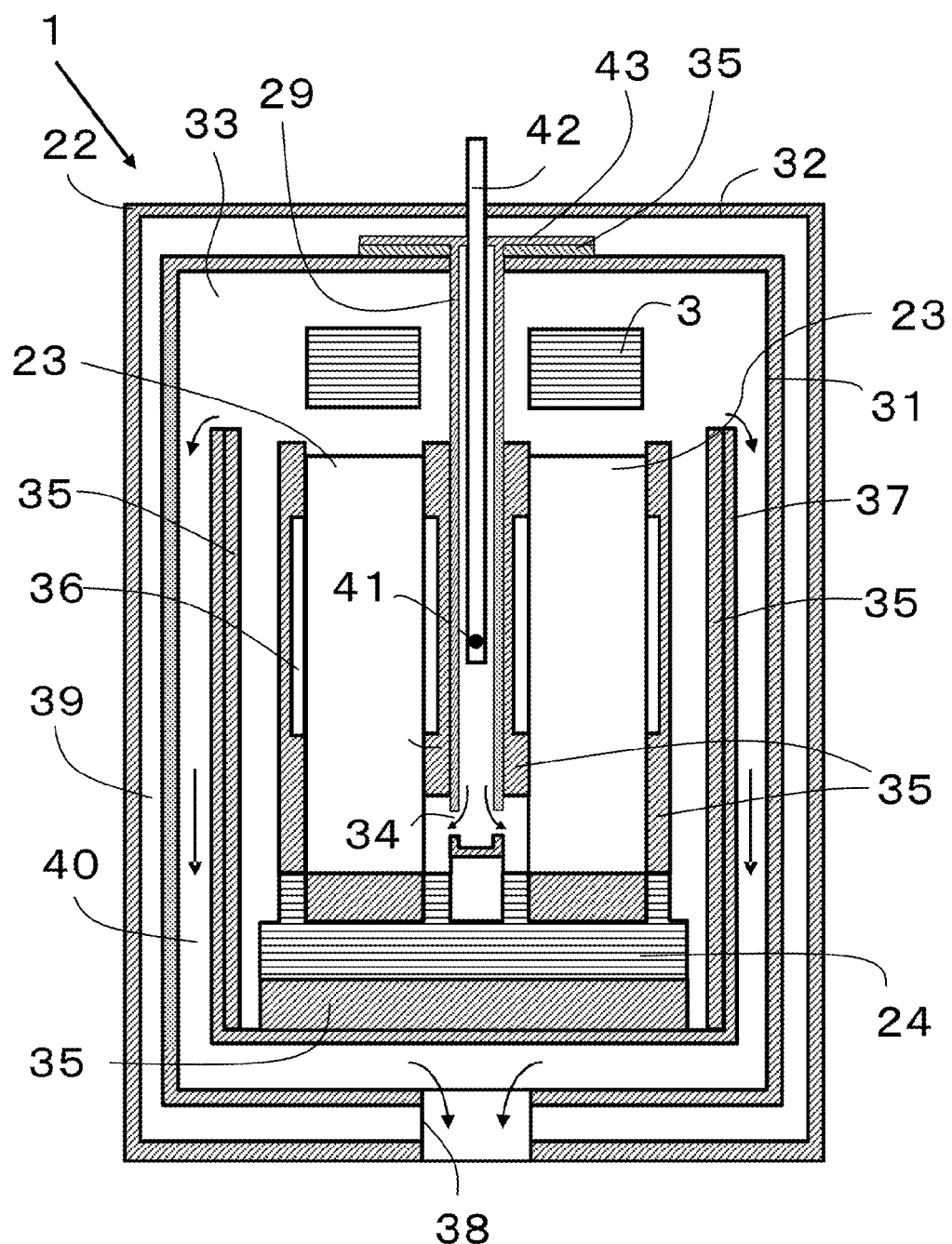
FIG. 3 is a cross-sectional view illustrating the fuel cell module illustrated in FIG. 2.

FIG. 2 is an external perspective view illustrating an example of the module in the fuel cell device that configures the hybrid system according to the present embodiment. FIG. 3 is a cross-sectional view of FIG. 2.

The module 1 illustrated in FIG. 2 is configured to accommodate a cell stack device 30 inside a container 22. The cell stack device 30 includes two cell stacks 2 in which columnar fuel cells 23 which have a fuel gas flow path (not illustrated) in which fuel gas circulates are arranged in a row in a state of standing upright, adjacent fuel cells 23 are connected electrically in series via a power collecting member (not illustrated in FIG. 2), and the lower end of the fuel cells 23 are fixed to a manifold 24 by an insulative joining material (not illustrated) such as a glass seal material. In addition, the cell stack device 30 includes, over the cell stack 2, the reformer 3 for generating fuel gas that is fed to the fuel cell 23. Conductive members (not illustrated) which have an electricity lead-out unit for collecting electricity generated through power generation of the cell stack 2 (fuel cell 23) are disposed at both end portions of the cell stack 2. The cell stack device 30 is configured to include each member described above. FIG. 2 illustrates a case where the cell stack device 30 includes two cell stacks 2, but it is possible to change the number of the cell stacks. For example, the cell stack device 30 may include only one cell stack 2.

In addition, FIG. 2 illustrates, as the fuel cell 23, a solid-oxide fuel cell 23 having a hollow flat plate shape which includes a fuel gas flow path in which fuel gas circulates in the longitudinal direction, and is formed of a fuel electrode layer, a solid electrolyte layer, and an oxygen electrode layer which are laminated in this order on a surface of a support which includes a fuel gas flow path. Oxygen-containing gas circulates between the fuel cells 23.

In addition, in the fuel cell device according to the present embodiment, the fuel cell 23 may be a solid-oxide fuel cell and, for example, can be flat plate-like or cylindrical, and the shape of the container 22 can be appropriately modified.

In addition, the reformer 3 illustrated in FIG. 2 performs reforming of the fuel source such as natural gas or kerosene which is supplied through a fuel source feeding pipe 28 such that fuel gas is generated. It is preferable that the reformer 3 have a structure in which the steam reforming can be performed as an efficient reforming reaction. The reformer 3 includes a vaporizing section 25 for vaporizing water and a reforming section 26 in which a reforming catalyst (not illustrated) for reforming the fuel source into the fuel gas is disposed. The fuel gas generated by the reformer 3 is fed to the manifold 24 through a fuel gas circulating pipe 27 and then is fed to the fuel gas flow path inside the fuel cells 23 by the manifold 24.

In addition, FIG. 2 illustrates a state in which a part (front and rear surfaces) of the container 22 is removed and the cell stack device 30 accommodated inside is taken out rearward. Here, in the module 1 illustrated in FIG. 2, it is possible for the cell stack device 30 to slide into the container 22 and to be accommodated therein.

An oxygen-containing gas guiding member 29 is disposed between the cell stacks 2 disposed in parallel on the manifold 24 inside the container 22 such that the oxygen-containing gas flows through the fuel cell 23 from the lower end portion toward the upper end portion.

As illustrated in FIG. 3, the container 22 configures the module 1 has a double structure including an interior wall 31 and an exterior wall 32 by which an exterior frame of the container 22 is formed and a generator space 33 in which the cell stack device 30 is accommodated is formed by the interior wall 31. Further, in the container 22, an oxygen-containing gas flow path 39, in which oxygen-containing gas that is guided to the fuel cell 23 circulates, is formed between the interior wall 31 and the exterior wall 32.

The oxygen-containing gas guiding member 29 includes an oxygen-containing gas inlet (not illustrated), a flange 43 and an oxygen-containing gas outlet 34. The oxygen-containing gas guiding member 29 is inserted through the interior wall 31 at the upper section of the container 22 so as to be fixed in the container 22. Oxygen-containing gas flow in through the oxygen-containing gas inlet. The oxygen-containing gas inlet and a flange 43 are provided at the upper side of the oxygen-containing gas guiding member 29. The oxygen-containing gas outlet 34 guides oxygen-containing gas to the lower end portion of the fuel cell 23. The oxygen-containing gas outlet 34 is provided at the lower portion of the oxygen-containing gas guiding member 29.

In FIG. 3, the oxygen-containing gas guiding member 29 is disposed to be positioned between the two cell stacks 2 disposed in parallel in the container 22, but can be appropriately disposed depending on the number of the cell stacks 2. For example, in a case where a single cell stack 2 is accommodated in the container 22, two oxygen-containing gas guiding members 29 are provided and can be disposed such that the cell stack 2 is interposed therebetween from both side surfaces.

In addition, in the generator space 33, the insulating member 35 for maintaining the temperature in the module 1 to be high is appropriately provided such that heat in the module 1 is not extremely diffused, the temperature of the fuel cell 23 (cell stack 2) is not lowered, and an amount of power generation is not reduced.

It is preferable that the insulating member 35 be disposed in the vicinity of the cell stack 2, be disposed on the side surfaces of the cell stack 2 along the arrangement direction of the fuel cells 23, and have a width equal to or more than the width of a side surface of the cell stack 2 along the arrangement direction of the fuel cell 23. It is preferable that the insulating member 35 be disposed on both side surfaces of the cell stack 2. In this way, it is possible to effectively suppress reduction of the temperature of the cell stack 2. Further, it is possible to suppress emission, from side surfaces of the cell stack 2, of the oxygen-containing gas that is guided by the oxygen-containing gas guiding member 29 and it is possible to quicken flowing of oxygen-containing gas between the fuel cells 23 that configure the cell stack 2. An opening 36 is provided in the insulating member 35 on both side surfaces of the cell stack 2 so as to adjust the flow of the oxygen-containing gas fed to the fuel cell 23 and to reduce the temperature distribution in the longitudinal direction of the cell stack 2 and in a stacking direction of the fuel cells 23.

In addition, an interior wall 37 for the exhaust gas is provided to the inside of the interior wall 31 along the arrangement direction of the fuel cells 23 and an exhaust gas flow path 40 through which the exhaust gas in the generator space 33 flows from the upper side to the lower side is formed between the interior wall 31 and the interior wall 37 for the exhaust gas. The exhaust gas flow path 40 communicates with an exhaust hole 38 provided on the bottom of the container 22. In addition, the insulating member 35 is provided on the cell stack 2 side of the interior wall 37 for the exhaust gas.

Thus, the exhaust gas produced through operation (during a start-up process, during power generation, during a stop process) of the module 1 flows through the exhaust gas flow path 40 and then is emitted through the exhaust hole 38. The exhaust hole 38 may be formed by cutting out a part of the bottom of the container 22 or by providing a pipe-like member.

A thermocouple 42 for measuring the temperature in the vicinity of the cell stack 2 is disposed in the oxygen-containing gas guiding member 29 such that a temperature sensing portion 41 of the thermocouple 42 is disposed at the central portion of the fuel cell 23 in the longitudinal direction and at the central portion of the fuel cells 23 in the arrangement direction.

In addition, in the module 1 having the configuration described above, the fuel gas and oxygen-containing gas, which are emitted from at least a part of the fuel gas flow path in the fuel cells 23 and are not used for power generation, are combusted between the upper end side of the fuel cells 23 and the reformer 3 and, thereby it is possible to raise and maintain the temperature of the fuel cells 23. Further, it is possible to warm the reformer 3 above the fuel cells 23 (cell stack 2) and it is possible to perform an efficient reforming reaction in the reformer 3. During normal power generation, the temperature in the module 1 is about 500° C. to 800° C. due to the combustion described above or the power generation of the fuel cells 23. Accordingly, the temperature of the exhaust gas emitted from the module 1 is very high.

Figure 4:
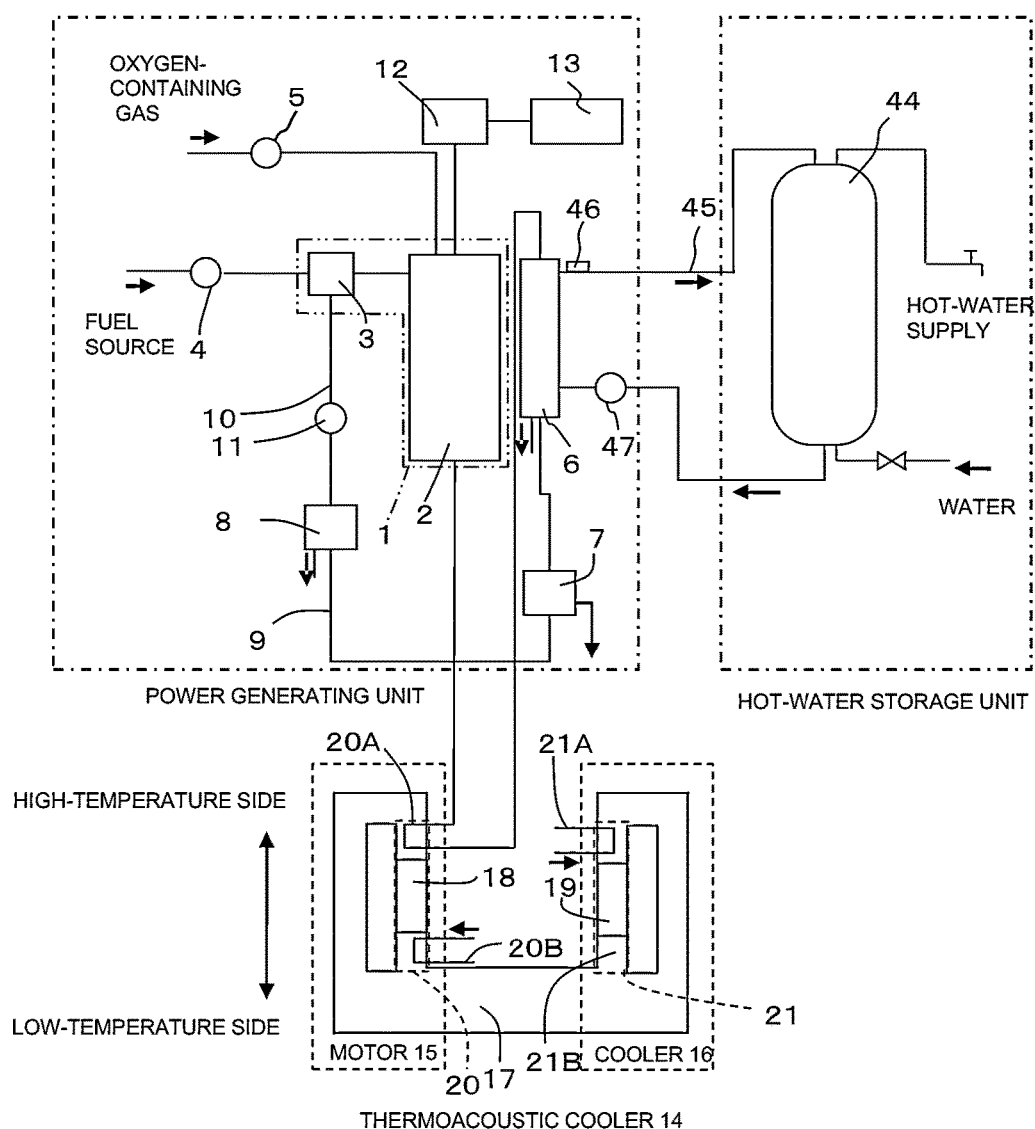
FIG. 4 is a diagram illustrating another example of a configuration of a hybrid system according to the present embodiment.

FIG. 4 is a diagram illustrating another example of a configuration of a hybrid system according to the present embodiment. When compared to the hybrid system according to the present embodiment illustrated in FIG. 1, The present embodiment has differences in that the fuel cell device includes a hot-water storage unit and heat exchange between the exhaust gas emitted from the fuel cell device and circulating water that circulates through the hot-water tank 44 and heat exchanger 6 is performed by the heat exchanger 6.

That is, when compared to the hybrid system illustrated in FIG. 1, the hybrid system illustrated in FIG. 4 includes circulation piping 45 that causes water to be circulated to the heat exchanger 6, an outlet water temperature sensor 46 for measuring the temperature of water (circulating water flow) which flows through an outlet of the heat exchanger 6 provided at the outlet of the heat exchanger 6, a circulation pump 47 for circulating water in the circulation piping 45, and a hot water tank 44 in which water (hot water) after flowing through the circulation piping 45 and being undergone heat exchange is stored.

In such a hybrid system, the exhaust gas flowing through the high-temperature side flow path 20A in the motor 15 (thermoacoustic energy generating section 20) of the thermoacoustic cooler 14 is sequentially fed to the heat exchanger 6, undergoes heat-exchange with the circulation water that flows through the circulation piping 45 in the heat exchanger 6, and hot water is produced.

That is, the hybrid system illustrated in FIG. 4, has three functions of, in addition to power generation in the fuel cell device and a cooling function in the thermoacoustic cooler, producing of hot water in the hot water unit. Accordingly, it is possible to achieve a hybrid system in which overall efficiency is improved.

Figure 5:
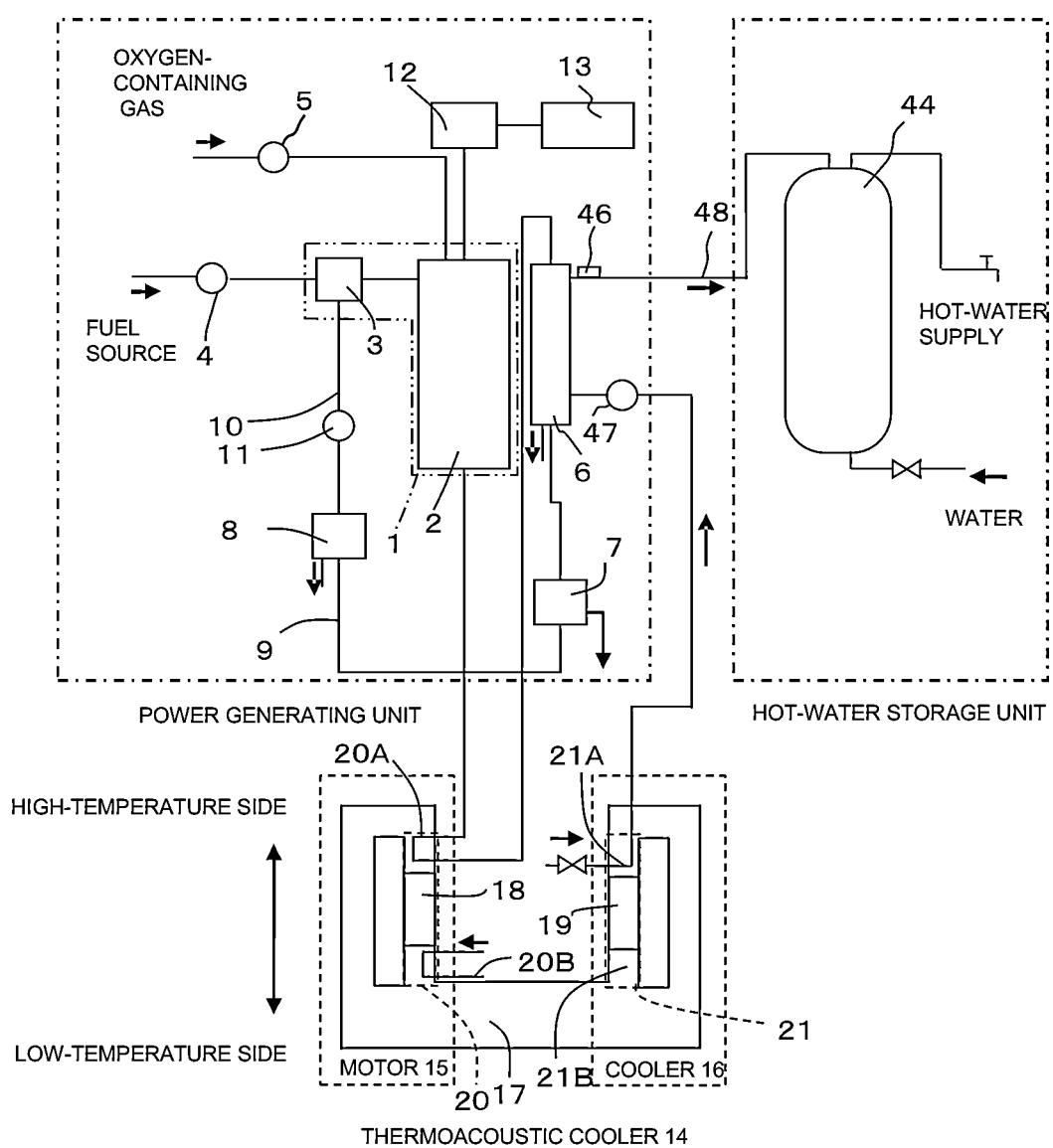
FIG. 5 is a diagram illustrating still another example of a configuration of a hybrid system according to the present embodiment.
Figure 6:
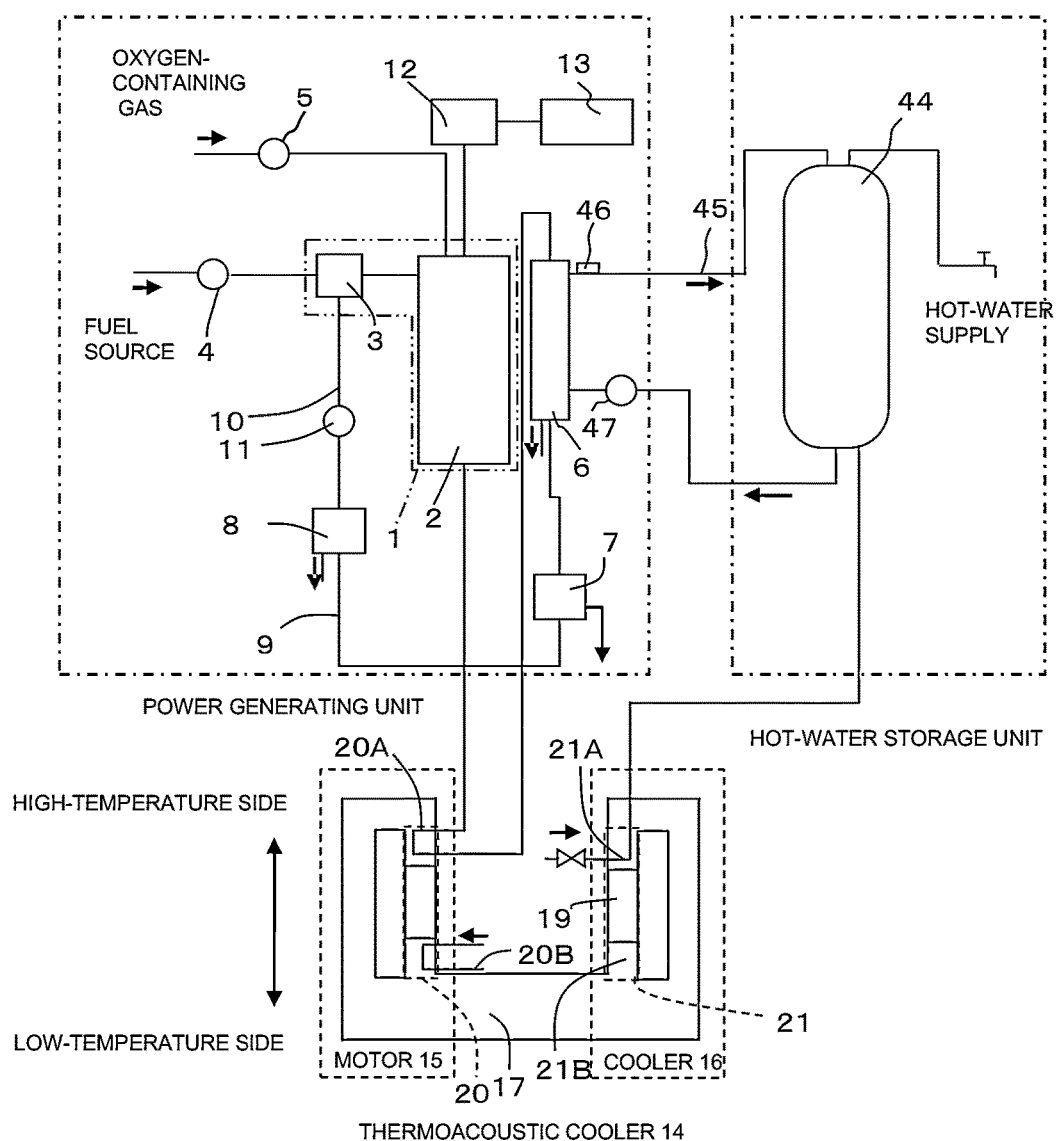
FIG. 6 is a diagram illustrating still another example of a configuration of a hybrid system according to the present embodiment.

FIGS. 5 and 6 are diagrams illustrating still another example of a configuration of a hybrid system according to the present embodiment.

In these hybrid systems, when compared to the hybrid system illustrated in FIG. 4, one end of the flow path 21A of the cooler 16 is connected to the heat exchanger 6 or the hot water tank 44. That is, water at room temperature flows through the flow path 21A, and the water from the flow path 21A flows directly to the heat exchanger 6, or through the hot water tank 44 and the circulation piping 45 to the heat exchanger 6. In the hybrid system illustrated in FIG. 5, instead of the circulation piping 45, a hot-water collecting pipe 48 connects the heat exchanger 6 and the hot water tank 44.

As described above, the temperature on the high-temperature side corresponding to one side of the heat accumulator 19 of the cooler 16 is maintained to be low and, thereby it is possible to lower the temperature on the low-temperature side corresponding to the other side of the heat accumulator 19. Then, the cooler 16 performs the function of cooling efficiently. In addition, the temperature on the high-temperature side of the heat accumulator 19 of the cooler 16 is maintained to be yet lower and, thereby the cooler 16 has a function as a freezing machine.

In a power generation system illustrated in FIGS. 5 and 6, water at room temperature flows through the flow path 21A of the cooler 16, whereby it is possible to maintain a low temperature on the high-temperature side of the heat accumulator 19, and it is possible for the cooler 16 to function as an efficient cooler. Further, the water from the flow path 21A flows directly to the heat exchanger 6 or flows through the hot water tank 44 and the circulation piping 45 to the heat exchanger 6 and, thereby it is possible to effectively utilize water. Thus, it is possible to achieve the hybrid system of which overall efficiency is further improved.

Figure 7:
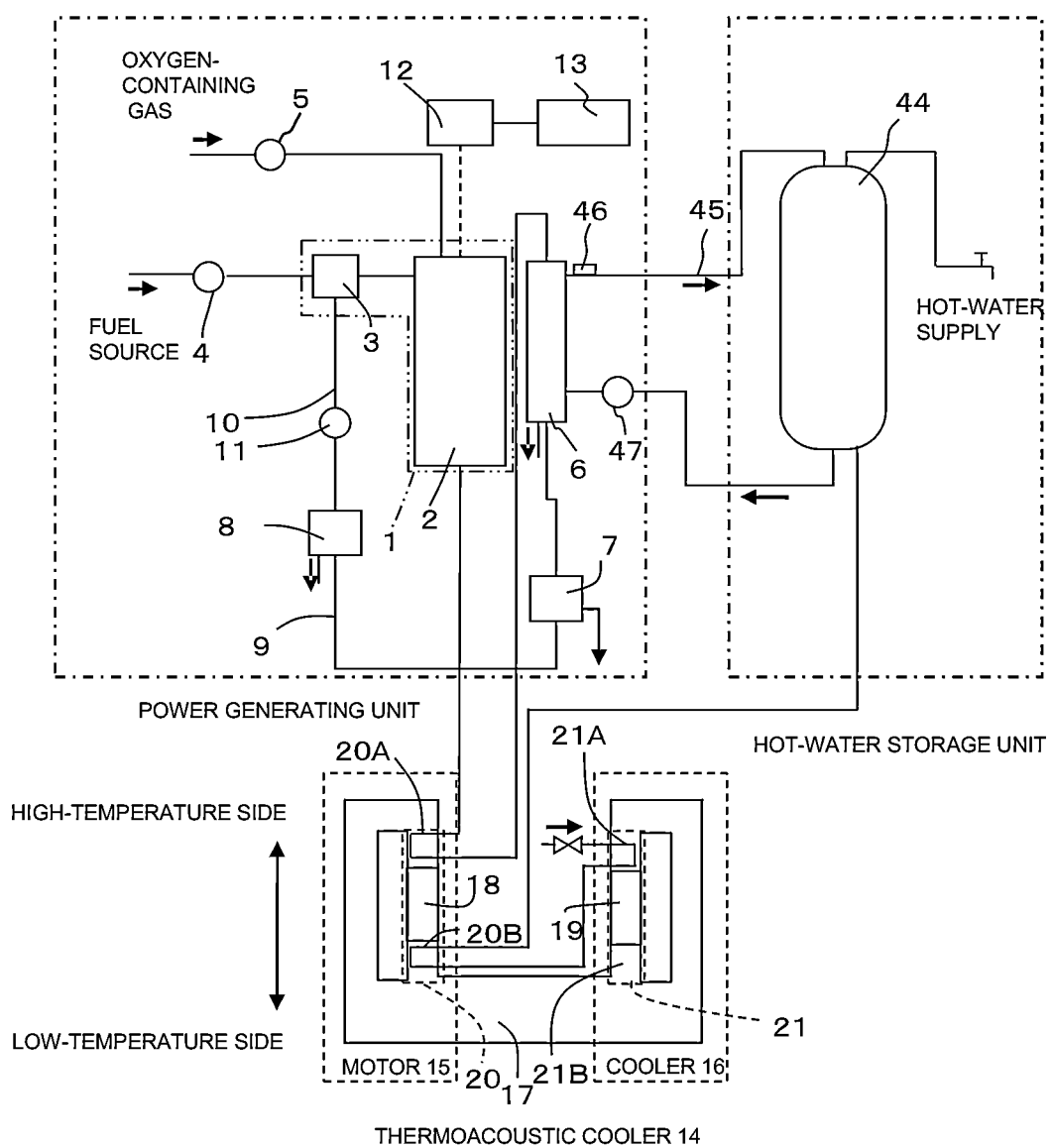
FIG. 7 is a diagram illustrating still another example of a configuration of a hybrid system according to the present embodiment.

FIG. 7 is a diagram illustrating still another example of a configuration of a power generation system according to the present embodiment. When compared to the hybrid system illustrated in FIG. 6, the flow path 21A and the low-temperature side flow path 20B are integrally formed and one end of the low-temperature side flow path 20B is connected to the heat exchanger 6. That is, a fluid after flowing through the flow path 21A of the cooling section 21 flows through the low-temperature side flow path 20B of the thermoacoustic energy generating section 20 and then flows to the heat exchanger 6.

As described above, the greater the temperature gradient between one side and the other side of the heat accumulator 18 in the thermoacoustic energy generating section 20, the greater the thermoacoustic energy likely to be generated. Here, the water at room temperature after flowing through the flow path 21A of the cooling section 21 is caused to flow continuously through the low-temperature side flow path 20B of the thermoacoustic energy generating section 20 and, thereby, the temperature gradient is more likely to be produced between one side and the other side of the heat accumulator 18 in the thermoacoustic energy generating section 20.

Further, the water at room temperature flowing through the flow path 21A of the cooling section 21 flows through the low-temperature side flow path 20B of the thermoacoustic energy generating section 20 and, then is fed to the lower section (low-temperature side) of the hot water tank 44, and thereby it is possible to utilize water more effectively. Thus, it is possible to achieve a hybrid system of which overall efficiency is further improved.

Figure 8:
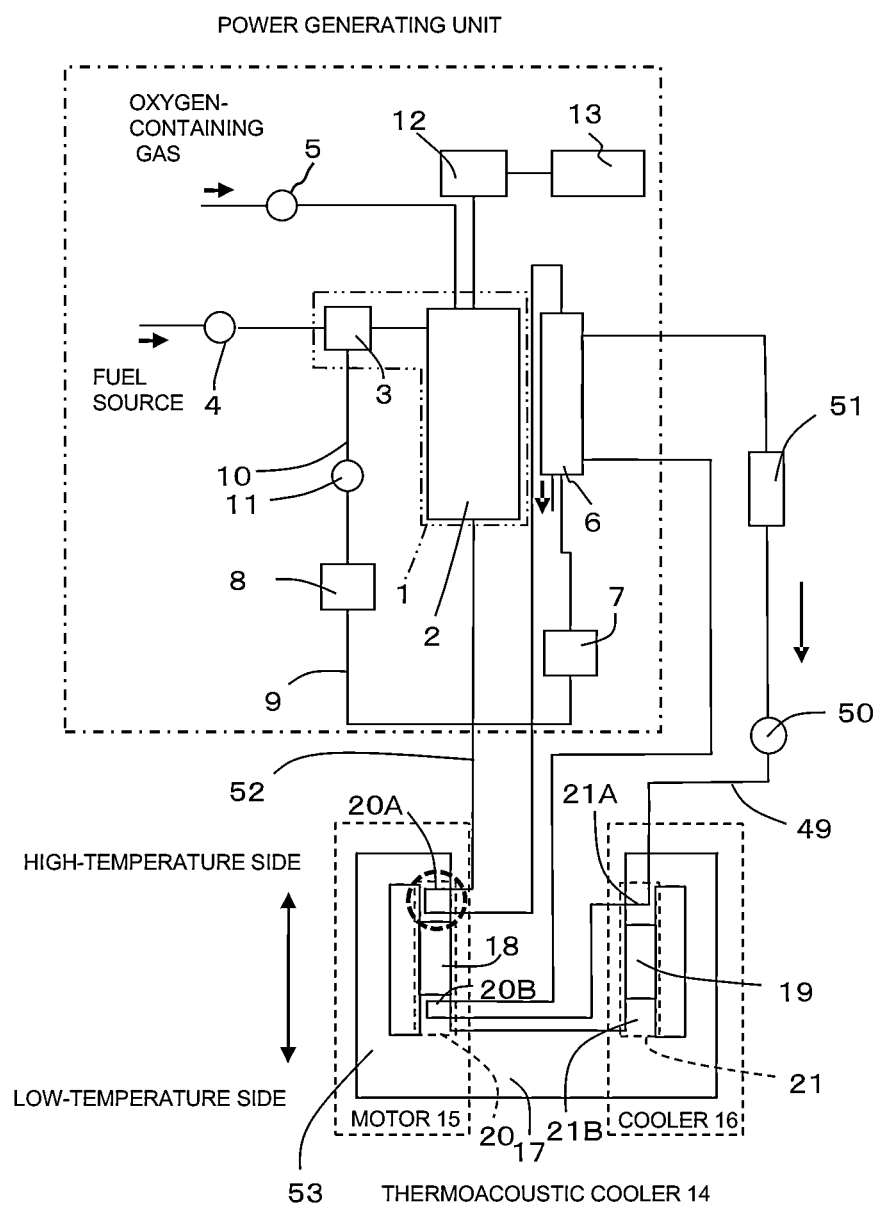
FIG. 8 is a diagram illustrating still another example of a configuration of a hybrid system according to the present embodiment.

FIG. 8 is a diagram illustrating still another example of a configuration of a hybrid system according to the present embodiment.

In the hybrid system illustrated in FIG. 8, the fuel cell device does not include the hot-water storage unit, but the heat exchanger 6 includes the circulation flow path 49 in which a fluid having undergone heat-exchange with the exhaust gas from the fuel cell device flows through the flow path 21A of cooling section 21, the low-temperature side flow path 20B of the thermoacoustic energy generating section 20, and the heat exchanger 6 in this order. That is, the flow paths are integrally formed.

In addition, a pump 50 is provided on the circulation flow path 49. Thus, there is no need to provide separate flow paths for respective heat exchanging portions and it is possible to more simply configure the thermoacoustic cooler 14. Control of operation of the pump 50 makes it possible to control a cooling function of the thermoacoustic cooler 14.

In addition, the circulation flow path 49 is configured to cause the fluid flowing through the circulation flow path 49 to flow through the flow path 21A of the cooling section 21 and then to flow through the low-temperature side flow path 20B of the thermoacoustic energy generating section 20. In this way, it is possible for the fluid low in temperature to flow through the flow path 21A of the cooling section 21 and, thus, it is possible for the cooling section 21 to have a greater cooling function. There is no particular limitation to a fluid flowing through the circulation flow path 49 and, for example, it is possible to use tap water, air, or the like at room temperature.

In addition, in the hybrid system illustrated in FIG. 8, a cooler 51 for cooling the fluid flowing through the circulation flow path 49 is provided in the circulation flow path 49.

The fluid flowing through the circulation flow path 49 becomes high in temperature at some times in a course of flowing through the low-temperature side of the thermoacoustic energy generating section 20, or in a course of heat exchange with the exhaust gas emitted from the fuel cell device in the heat exchanger 6. Particularly, the fluid becomes significantly high in temperature some times, through heat exchange with the exhaust gas emitted by the fuel cell device in heat exchanger 6. When such a fluid high in temperature flows through the high-temperature side of the cooling section 21, the temperature on the low-temperature side rises. Then, there is a concern that the cooling function may deteriorate.

Thus, in the hybrid system illustrated in FIG. 8, since the cooler 51 for cooling the fluid flowing through the circulation flow path 49 is provided on the circulation flow path 49, it is possible to maintain the temperature of the fluid flowing through the circulation flow path 49 to be low and it is possible to suppress deterioration of the cooling function in the cooling section 21.

The cooler 51 may perform cooling of the fluid flowing through the circulation flow path 49, but the configuration is not limited thereto. For example, it is possible for the circulation flow path 49 to pass through a container where tap water is stored, other than a radiator, or for the circulation flow path 49 be provided around a cylindrical body in which tap water flows.

Further, in FIG. 8, in the thermoacoustic energy generating section 20, an exhaust gas pipe through which the exhaust gas emitted from the fuel cell device flows and of which a part becomes the flow path 20A is represented by an exhaust gas pipe 52. In addition, in the thermoacoustic energy generating section 20, piping in which the heat accumulator 18 is disposed is represented by piping 53. The piping will be described later.

Figure 9:
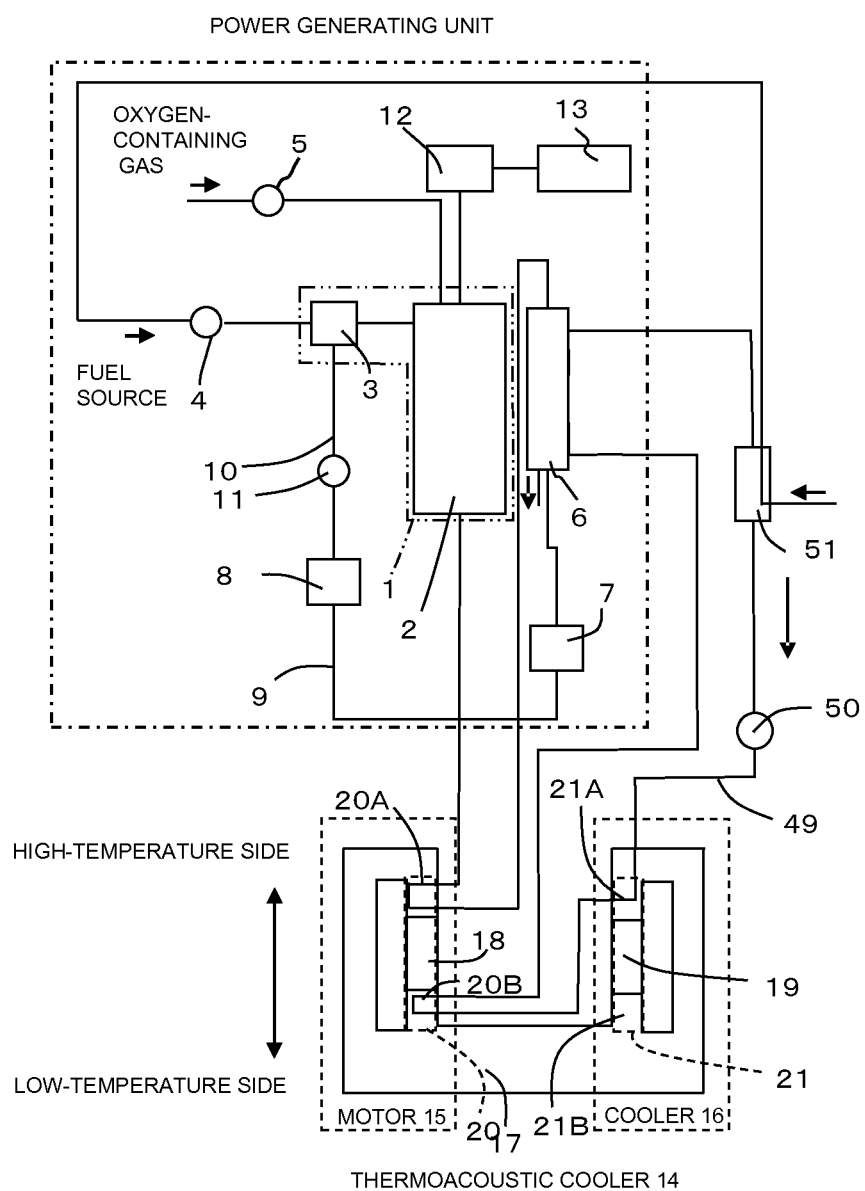
FIG. 9 is a diagram illustrating still another example of a configuration of a hybrid system according to the present embodiment.
Figure 10:
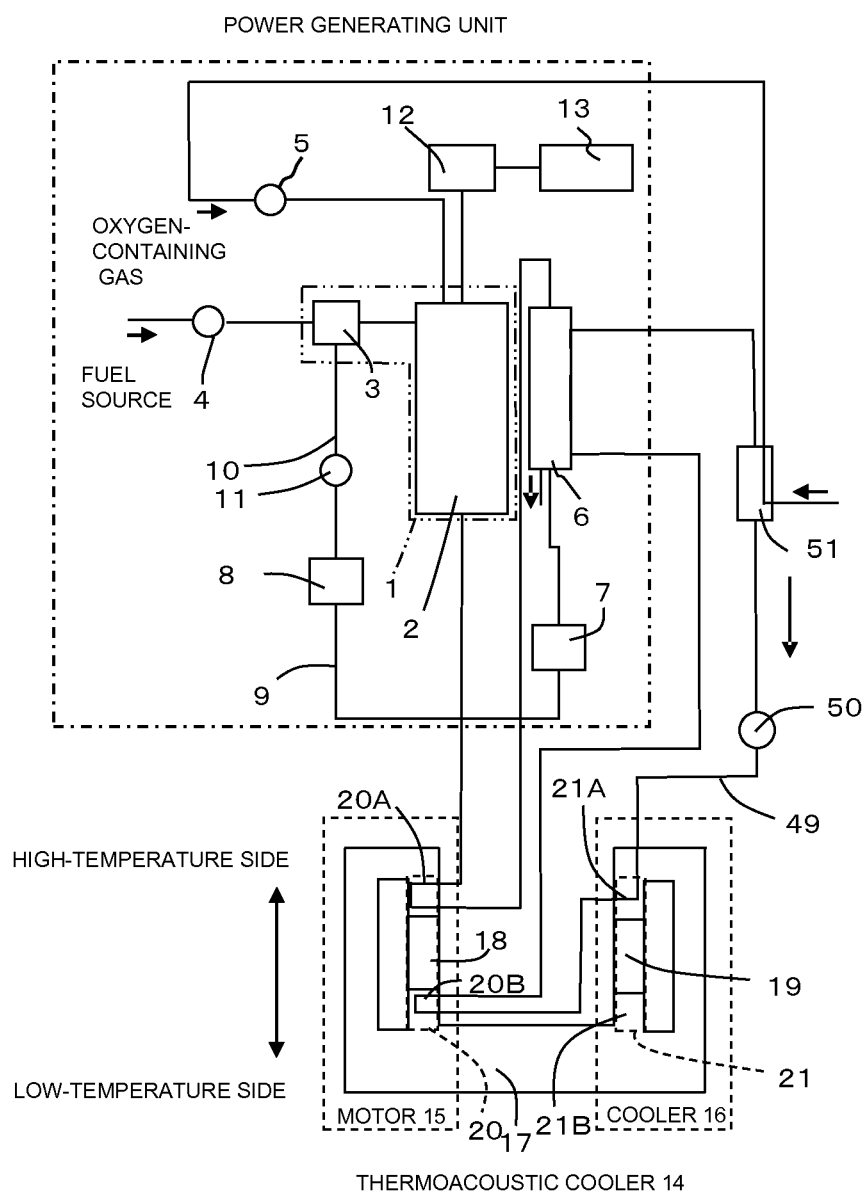
FIG. 10 is a diagram illustrating still another example of a configuration of a hybrid system according to the present embodiment.

FIGS. 9 and 10 are diagrams illustrating still another example of a configuration of a hybrid system according to the present embodiment. When compared to the hybrid system in FIG. 8, the hybrid system in FIG. 9 has a configuration in which heat exchange between the fluid flowing through the circulation flow path 49 and the fuel source which is fed to the reformer 3 is performed in the cooler 51 and the hybrid system in FIG. 10 has a configuration in which heat exchange between the fluid flowing through the circulation flow path 49 and the oxygen-containing gas which is fed to the cell stack 2 is performed in the cooler 51. That is, the cooler 51 functions as a heat exchanging section.

Particularly, in the fuel cell device that uses the solid-oxide fuel cell 23 as the fuel cell 23, power generation of the fuel cell 23 is performed at a very high temperature. Therefore, it is preferable that the temperature of the fuel source or the oxygen-containing gas which is fed to the module 1 be high. Here, in the cooler 51, the fluid flowing through the circulation flow path 49 undergoes heat-exchange with the fuel source or the oxygen-containing gas and, thereby, it is possible to raise the temperature of the fuel source or the oxygen-containing gas which is fed to the module 1. Thus, it is possible to improve power generation efficiency of the fuel cell device and it is possible to achieve a hybrid system of which overall efficiency is improved.

FIGS. 11A to 11D are external perspective views or cross-sectional views illustrating a dispositional relationship between an exhaust gas pipe and piping in the hybrid system according to the present embodiment.

Figure 11A:
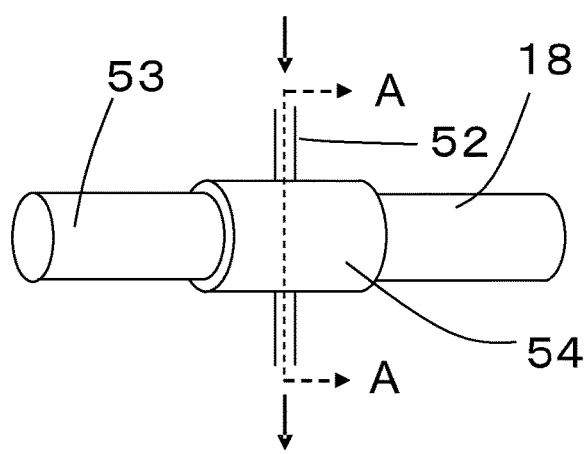
FIGS. 11A to 11D are external perspective views or cross-sectional views illustrating a dispositional relationship between an exhaust gas pipe and piping in a thermoacoustic energy generating section in the hybrid system according to the present embodiment.
Figure 11B:
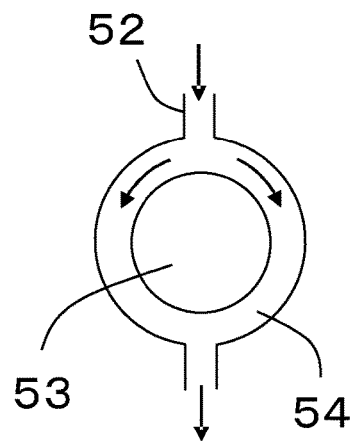
Figure 11C:
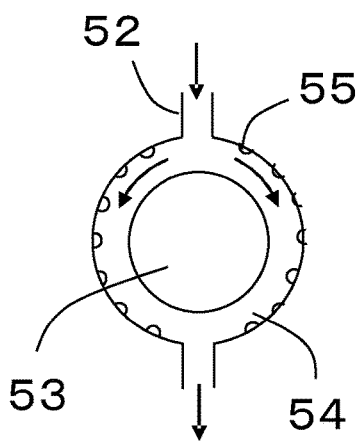
Figure 11D:
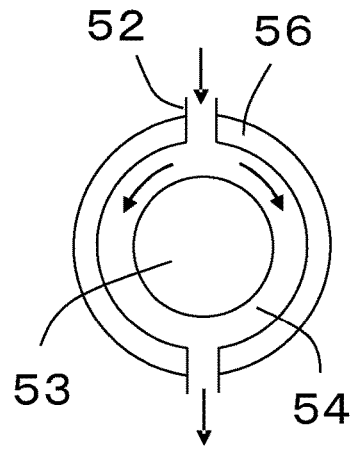

FIGS. 11A to 11D shows external perspective views or cross-sectional views selectively illustrating connections or examples of the connection shapes between the piping 53 and the exhaust gas pipe 52 surrounded by a dotted line in FIG. 8. FIG. 11A is an external perspective view illustrating a structure at a position (hereinafter, in the exhaust gas pipe 52 and the piping 53, a structure at a portion where the exhaust gas pipe 52 covers the piping 53 is referred to as a double pipe 54) at which the exhaust gas pipe 52 covers the piping 53. FIG. 11B is a cross-sectional view taken along line A-A in FIG. 11A, FIG. 11C is a cross-sectional view illustrating another example, and FIG. 11D is a cross-sectional view illustrating still another example. Here, these configurations are described in this order.

FIGS. 11A and 11B illustrate selectively the high-temperature side of the heat accumulator 18 in the piping 53 and show a structure of the double pipe 54 in which the exhaust gas pipe 52 is disposed to cover the outer circumference of the piping 53. Thus, the heat of the exhaust gas emitted from the fuel cell device which flows in the exhaust gas pipe 52 (in other words, in the high-temperature side flow path 20A, and hereinafter, used with the same meaning) is efficiently transferred to the piping 53 and, thereby, it is possible to cause the temperature gradient in the thermoacoustic energy generating section 20 to be great.

FIGS. 11A and 11B illustrate an example of a configuration in which the exhaust gas flowing through the exhaust gas pipe 52 flows from the upper side to the lower side. As long as the structure of the double pipe 54 is provided, the exhaust gas flowing through the exhaust gas pipe 52 can flow in a horizontal direction, in addition to the vertical direction.

In addition, when conductivity of the exhaust gas flowing through the exhaust gas pipe 52 to the piping 53 is improved, the heat conductivity of the exhaust gas pipe 52 can be further improved than the heat conductivity of the piping 53. Thus, it is possible to efficiently transfer heat of the exhaust gas flowing through the exhaust gas pipe 52 to the piping 53 and it is possible to improve the performance of the thermoacoustic cooler 14.

FIG. 11C illustrates a configuration in which a protrusion 55 that protrudes toward the piping 53 is provided on the inner wall of the exhaust gas pipe 52 at a portion on an outer circumference of the piping 53 which corresponds to a portion that becomes the double pipe 54.

In such a configuration, the exhaust gas flowing through the exhaust gas pipe 52 produces turbulence and it is possible to efficiently transfer heat of the exhaust gas flowing through the exhaust gas pipe 52 to the piping 53. FIG. 11C illustrates a configuration in which the protrusion 55 is provided on the inner wall of the exhaust gas pipe 52; otherwise, in a case where a protrusion that protrudes toward the exhaust gas pipe 52 is provided on an outer wall in a portion of the piping 53 which becomes the double pipe 54, it is possible to increase the surface area of the piping 53 in addition to producing turbulence by the exhaust gas flowing through the exhaust gas pipe 52. Then, it is possible to further efficiently transfer heat of the exhaust gas flowing through the exhaust gas pipe 52 to the piping 53. It is possible to provide the protrusion 55 on both the exhaust gas pipe 52 and the piping 53; however, in this case, it is preferable that the protrusions 55 be provided to an extent that there is no effect on the flow of the exhaust gas flowing through the exhaust gas pipe 52.

FIG. 11D illustrates a configuration in which an insulating member 56 is provided on an outer circumference of a portion (portion of double pipe 54) of the exhaust gas pipe 52 corresponding to the high-temperature side of the thermoacoustic energy generating section. In this way, the insulating member 56 is provided over the outer circumference of a portion of the exhaust gas pipe 52 corresponding to the high-temperature side of the thermoacoustic energy generating section, whereby, it is possible to suppress diffusion of heat of the exhaust gas flowing through the exhaust gas pipe 52, and it is possible to transfer more heat to the piping 53. FIG. 11D illustrates an example in which the insulating member 56 is provided over the outer circumference of a portion of the exhaust gas pipe 52 corresponding to the high-temperature side of the thermoacoustic energy generating section; however, the insulating member 56 may cover the entire exhaust gas pipe 52 such that the temperature of the heat of the exhaust gas flowing through the exhaust gas pipe 52 is maintained to be high.

Further, in the above description, the exhaust gas pipe 52 and the piping 53 are configured as the double pipe; however, the shape of the double pipe is not limited, as long as the heat of the exhaust gas flowing through the exhaust gas pipe 52 is transferred efficiently to the piping 53. For example, an exhaust gas pipe 52 may be provided which wraps around the outer circumference of the piping 53 in a spiral shape.

Figure 12:
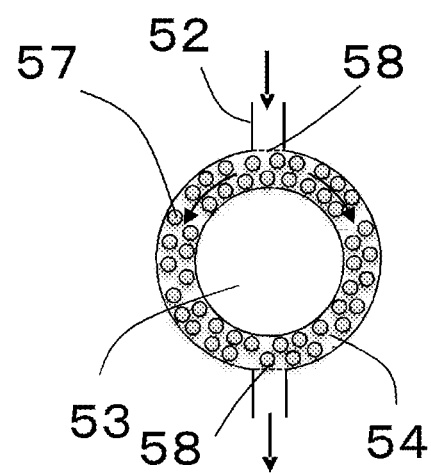
FIG. 12 is a cross-sectional view illustrating a combustion catalyst disposed in the exhaust gas pipe at a portion where the exhaust gas pipe is connected to the piping illustrated in FIGS. 11A to 11D.

FIG. 12 illustrates an example in which, in the configuration of the exhaust gas pipe 52 and the piping 53 illustrated in FIG. 11B, a combustion catalyst 57 is disposed inside the portion (portion of the double pipe 54) of the exhaust gas pipe 52 to which the piping 53 is connected.

As described above, the heat of the exhaust gas flowing through the exhaust gas pipe 52 is transferred to the piping 53 and, thereby it is possible to cause the temperature gradient in the thermoacoustic energy generating section 20 to become greater. Here, unburned fuel gas is contained in the exhaust gas flowing through the exhaust gas pipe 52 in some cases. Accordingly, the combustion catalyst 57 is provided inside at least the portion of the exhaust gas pipe 52 to which the piping 53 is connected and, thereby the unburned gas components contained in the exhaust gas are subjected to a combustion reaction. Therefore, when compared to a case where the combustion catalyst is not provided, it is possible to achieve a high temperature state. Thus, it is possible to increase a practical heat capacity of the exhaust gas flowing through the exhaust gas pipe 52. Thus, since it is possible to increase an amount of heat transferred to the piping 53, it is possible to increase the temperature gradient in the thermoacoustic energy generating section 20 and the cooling section 16 can efficiently perform a cooling function. The combustion catalyst 57 may be disposed at least inside the portion of the exhaust gas pipe 52 to which the piping 53 is connected and it is possible to provide the combustion catalyst 57 in other portions of the exhaust gas pipe 52.

Here, as the combustion catalyst 57, it is possible to use a combustion catalyst which is commonly used and for example, it is possible to use a combustion catalyst in which a catalyst such as a noble metal such as platinum or palladium is carried on a porous carrier such as y-alumina, a-alumina, or cordierite.

In addition, in FIG. 12, a partition member 58 is disposed at a position where the combustion catalyst 57 is disposed such that the combustion catalyst 57 does not fall out, which is disposed inside the exhaust gas pipe 52 at a portion to which the piping 53 is connected. FIG. 12 illustrates an example in which, in the exhaust gas pipe at a portion to which the piping 53 is connected, the partition member 58 is provided at two places of an entrance side and an outlet side (up and down) with respect to a flowing direction of the exhaust gas. As long as the partition member 58 has heat resistance, does not interrupt the flow of the exhaust gas, and further can suppress falling out of the combustion catalyst 57, there is no limitation to the member. For example, as the partition member 58, it is possible to use a mesh-like member made of a metal or the like.

FIG. 12 shows a configuration based on the configuration illustrated in FIG. 11B, and, for example, the same combustion catalyst 57 can be provided to the configuration illustrated in FIGS. 11C and 11D.

The present invention is described in detail as above, but the present invention is not limited to the above embodiments, and can be modified and improved in various ways within a range without departing from the spirit of the invention.

For example, in the hybrid system described above, an example of the fuel cell device is described using the fuel cell device that includes the solid-oxide fuel cell, but a polymer electrolyte fuel cell may be included. In a case where the polymer electrolyte fuel cell is used, for example, heat produced during the reforming reaction is effectively used or the configuration may appropriately be modified.

REFERENCE SIGNS LIST

1 FUEL CELL MODULE
6 HEAT EXCHANGER
14 THERMOACOUSTIC COOLER
20 THERMOACOUSTIC ENERGY GENERATING SECTION
21 COOLING SECTION
44 HOT WATER TANK
49 CIRCULATION FLOW PATH
51 COOLER
52 EXHAUST GAS PIPE
53 PIPING

The invention claimed is:

1. A hybrid system comprising:
a fuel cell device; and
a thermoacoustic cooler,
wherein the thermoacoustic cooler includes:
    a thermoacoustic energy generating section in which thermoacoustic energy is generated by a temperature gradient between a high-temperature side and a low-temperature side; and
    a cooling section in which a function of cooling is performed in the low-temperature side using the temperature gradient between the high-temperature side and the low-temperature side which is produced when the thermoacoustic energy transmitted from the thermoacoustic energy generating section is converted into energy, and
a heat exchanger that performs heat exchange between an exhaust gas emitted from the fuel cell device and a fluid and lowers a temperature of the exhaust gas,
wherein the exhaust gas emitted from the fuel cell device flows to the heat exchanger after flowing through the high-temperature side of the thermoacoustic energy generating section and
wherein the fluid flows through the high-temperature side of the cooling section and the fluid flows to the heat exchanger after flowing through the high-temperature side of the cooling section.

2. The hybrid system according to claim 1,
wherein the fluid flows through the high-temperature side of the cooling section and the fluid flows to the heat exchanger after flowing through the high-temperature side of the cooling section and through the low-temperature side of the thermoacoustic energy generating section.

3. The hybrid system according to claim 1, further comprising:
a circulation flow path in which the fluid flows through the high-temperature side of the cooling section, the low-temperature side of the thermoacoustic energy generating section, and the heat exchanger in this order.

4. The hybrid system according to claim 3, further comprising:

a cooler that is provided on the circulation flow path between the heat exchanger and the high-temperature side of the cooling section and is configured to cool the fluid flowing through the circulation flow path.

5. The hybrid system according to claim 4, wherein the cooler functions as a heat exchanger in which heat exchange is performed between the fluid flowing through the circulation flow path and a gas which is fed to the fuel cell device.

6. The hybrid system according to claim 1, wherein the thermoacoustic energy generating section includes piping in which a heat accumulator is disposed, and
wherein an exhaust gas pipe through which the exhaust gas emitted from the fuel cell device flows is disposed in the piping around the high-temperature side of the thermoacoustic energy generating section.

7. The hybrid system according to claim 6, wherein an insulating member is provided to cover the exterior circumference at a portion of the exhaust gas pipe which corresponds to the high-temperature side of the thermoacoustic energy generating section in the piping.

8. The hybrid system according to claim 6, wherein heat conductivity of the exhaust gas pipe is higher than the heat conductivity of the piping.

9. The hybrid system according to claim 6, wherein a combustion catalyst is disposed inside a portion of the exhaust gas pipe to which the piping is connected.

10. A hybrid system comprising:
a fuel cell device; and
a thermoacoustic cooler,
wherein the thermoacoustic cooler includes:
a thermoacoustic energy generating section in which thermoacoustic energy is generated by a temperature gradient between a high-temperature side and a low-temperature side; and
a cooling section in which a function of cooling is performed in the low-temperature side using the temperature gradient between the high-temperature side and the low-temperature side which is produced when the thermoacoustic energy transmitted from the thermoacoustic energy generating section is converted into energy, and
wherein exhaust gas emitted from the fuel cell device flows through the high-temperature side of the thermoacoustic energy generating section, and
a heat exchanger that performs heat exchange between the exhaust gas emitted from the fuel cell device and water and lowers a temperature of the exhaust gas,
wherein the exhaust gas emitted from the fuel cell device flows to the heat exchanger after flowing through the high-temperature side of the thermoacoustic energy generating section,
wherein the water flows through the high-temperature side of the cooling section and the water flows to the heat exchanger after flowing through the high-temperature side of the cooling section,
wherein the water flows through the high-temperature side of the cooling section and the water flows to the heat exchanger after flowing through the low-temperature side of the cooling section and through the low-temperature side of the thermoacoustic energy generating section.

* * * * *